US008468067B2

(12) United States Patent
Azzouz et al.

(10) Patent No.: US 8,468,067 B2
(45) Date of Patent: *Jun. 18, 2013

(54) REMANUFACTURED PART CORE RETURN PROCESS AND SYSTEM

(75) Inventors: Jimmy Azzouz, Livonia, MI (US);
Thomas E. Salapatek, Canton, MI (US);
Richard J. Buiteweg, Warrem, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/005,160

(22) Filed: Jan. 12, 2011

(65) Prior Publication Data
US 2011/0106666 A1 May 5, 2011

Related U.S. Application Data

(62) Division of application No. 11/532,668, filed on Sep. 18, 2006, now Pat. No. 7,895,089.

(51) Int. Cl.
*G06Q 10/00* (2006.01)
*G06G 1/14* (2006.01)

(52) U.S. Cl.
USPC ............................................. 705/28; 705/22

(58) Field of Classification Search
None
See application file for complete search history.

(56) References Cited

U.S. PATENT DOCUMENTS

| 6,725,204 | B1 | 4/2004 | Gusley | |
|---|---|---|---|---|
| 7,222,786 | B2 * | 5/2007 | Renz et al. | 235/385 |
| 7,277,862 | B1 * | 10/2007 | Adgaonkar et al. | 705/7.25 |
| 2004/0039658 | A1 * | 2/2004 | Hume et al. | 705/26 |

* cited by examiner

*Primary Examiner* — Fahd Obeid
(74) *Attorney, Agent, or Firm* — Damian Porcari; Brooks Kushman P.C.

(57) ABSTRACT

One aspect of the present invention is a computer-implemented method for processing remanufactured part cores. The method includes receiving manufactured part core inventory information. The inventory information can include an inventory forecast and an inventory level for a number of parts. The method further includes receiving a part number of a part to be processed. The part to be processed is a member of the number of parts. The method further includes receiving one or more business rules for processing the part to be processed. A part disposition for the part to be processed is determined based on the remanufactured part core inventory information, the one or more business rules and the part number.

19 Claims, 3 Drawing Sheets

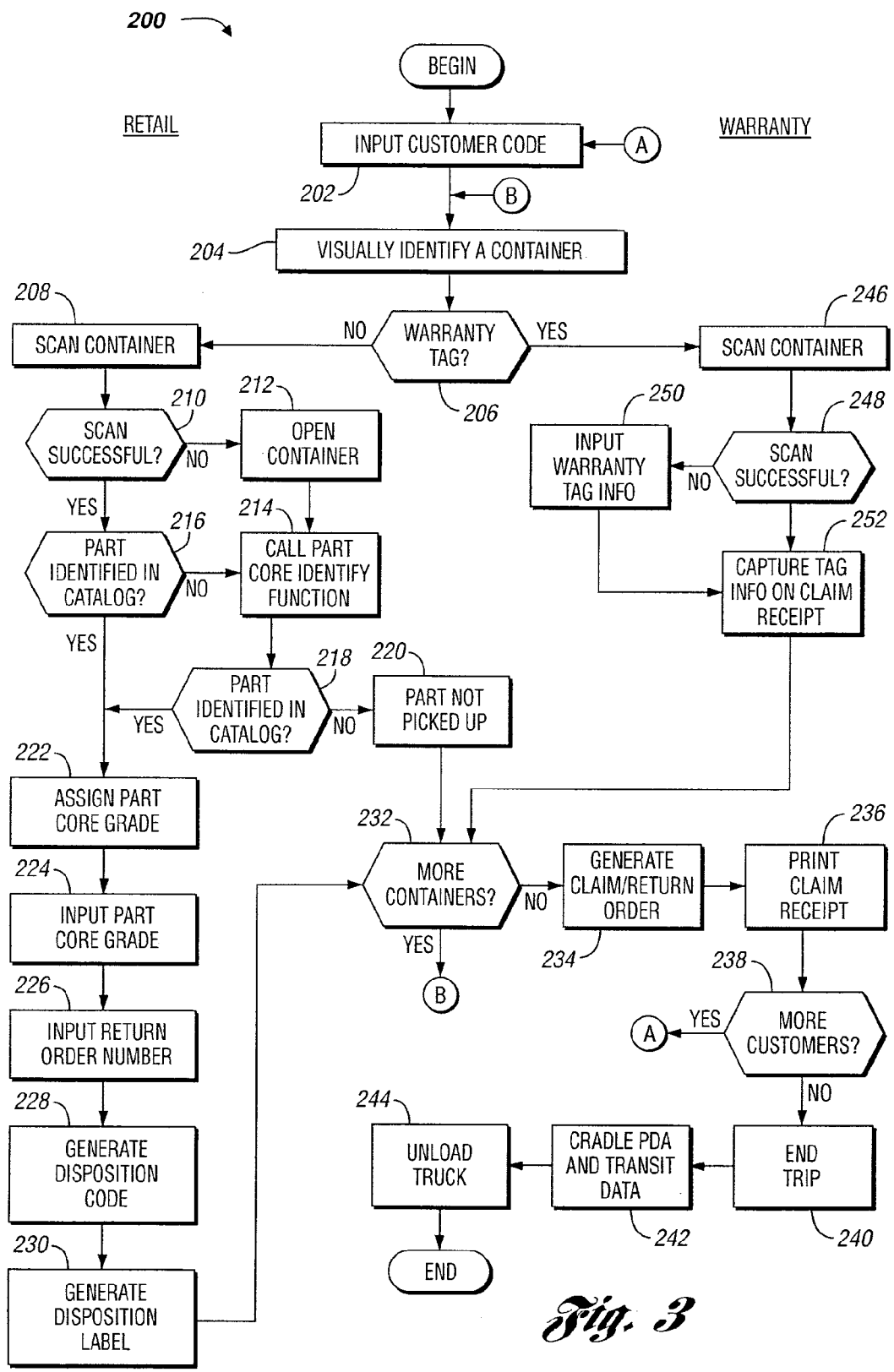

REMANUFACTURED PART CORE RETURN PROCESS AND SYSTEM

CROSS-REFERENCE TO RELATED APPLICATIONS

This application is a division of U.S. application Ser. No. 11/532,668 filed Sep. 18, 2006, which is incorporated by reference in its entirety.

BACKGROUND

1. Technical Field

One aspect of the present invention generally relates to a remanufactured part core return process and system.

2. Background Art

Remanufactured part programs rely on the cheap availability of quality used parts, otherwise referred to as cores, to be remanufactured. Brokers and junkyards collect cores in high volume industries, for example, the automotive industry. However, this supply is often unreliable and costly. Oftentimes, the core shipment includes several cores having one or more defects, e.g. rusting, denting and/or corrosion. Moreover, in many cases, the availability of cores for remanufacturing operations is an issue. Many new part production plants routinely sell excess production or defective parts (which are often sold to and used by competitors), rather than holding these parts for later use as cores in remanufacturing operations, thereby increasing manufacturing costs.

In attempting to solve the core availability and quality issues, some part sellers have implemented reverse distribution processes which typically require several distributors, in some cases, hundreds of distributors, of new parts to pick up and return old cores. Customers of the part sellers willingly return old cores in order to obtain a refund of deposits, which were collected when they purchased new parts.

While partially addressing the core availability and quality issues, managing the return and crediting processes, especially through hundreds of return points, is relatively expensive. On some parts, the relative high cost of collecting and returning cores precludes the use of a remanufacturing program. To lower remanufacturing costs, some manufacturers enforce core pickup rules on their distributors, which typically require the distributors to pick up only non-defective cores from customers, and/or negotiate the amount of deposit refund to pay customers depending on the condition of the cores. These pickup rule programs may cause dissatisfaction in retail outlets, which have difficulty collecting refunds, and in distribution outlets, which are caught in the middle. Some manufacturers pass increased core handling costs of the cumbersome return process on to customers. In recent years, only 70% of United States automotive dealers on average were satisfied with the core return practices of the automotive OEMs.

Moreover, the shear number of distributors needed for a typical reverse distribution process produces relatively high handling and transportation costs.

In light of the foregoing, a method and system for returning remanufactured part cores is needed. What is also needed is a computer-implemented method and system for returning remanufactured part cores.

SUMMARY

One aspect of the present invention is a method and system for processing remanufactured part cores. Another aspect of the present invention is a computer-implemented method and system for processing remanufactured part cores.

According to a first embodiment of the present invention, a computer-implemented method for processing a remanufactured part core is disclosed. The method includes receiving remanufactured part core information, which can include an inventory forecast and an inventory level for a number of parts. The method also includes receiving a part number of a part to be processed. The part to be processed is a member of the number of parts. The method also includes receiving one or more business rules for processing the part. The part disposition for the part is determined based on the remanufactured part core inventory information, the one or more business rules and the part number.

The method can further include transmitting the part disposition so that it can be relied upon to process the part. The method can further include transmitting the part number from a remote location using a portable electronic device. The part disposition can be selected from the group consisting of holding the part, shipping the part, scrapping the part and selling the part.

The method can further include generating a claim receipt including the part number and the part disposition. The method can further include determining a core deposit credit value for the part to be processed. The method can further include receiving a grade for the part to be processed.

The determining step can include determining the part disposition for the part to be processed based on the manufactured part core inventory information, the one or more business rules, the part number and the part grade.

According to another embodiment of the present invention, a computer system is disclosed that has a central processing unit (CPU) for executing machine instructions and a memory for storing machine instructions that are to be executed by the CPU. Machine instructions when executed by the CPU implement the following functions: receiving a part number of a part to be processed; receiving a part disposition for the part based on the remanufactured part core inventory information, one or more business rules and the part number; and transmitting the part disposition so that it can be relied upon to process the part. The computer can be a portable electronic device: e.g. a portable digital assistant (PDA). The part disposition can be selected from the group consisting of holding the part, shipping the part, scrapping the part and selling the part.

The functions to be executed by the CPU can further include generating a claim receipt including the part number and the part disposition; determining a core deposit value for the part to be processed; and/or receiving a grade for the part to be processed.

According to yet another embodiment of the present invention, a computer-implemented method for processing remanufactured part cores is disclosed. The method can include receiving one or more business rules relating to the disposition of a part, receiving a part number of a part to be processed, and determining a disposition for the part to be processed based on the one or more business rules and the part number. The one or more business rules can be related to inventory management and/or part handling. The method can further include transmitting the part number from a remote location using a portable electronic device, e.g. a portable digital assistant (PDA).

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

FIG. 3 is a flowchart depicting the steps of a part core processing method according to one embodiment of the present invention.

DETAILED DESCRIPTION

Figure 1:
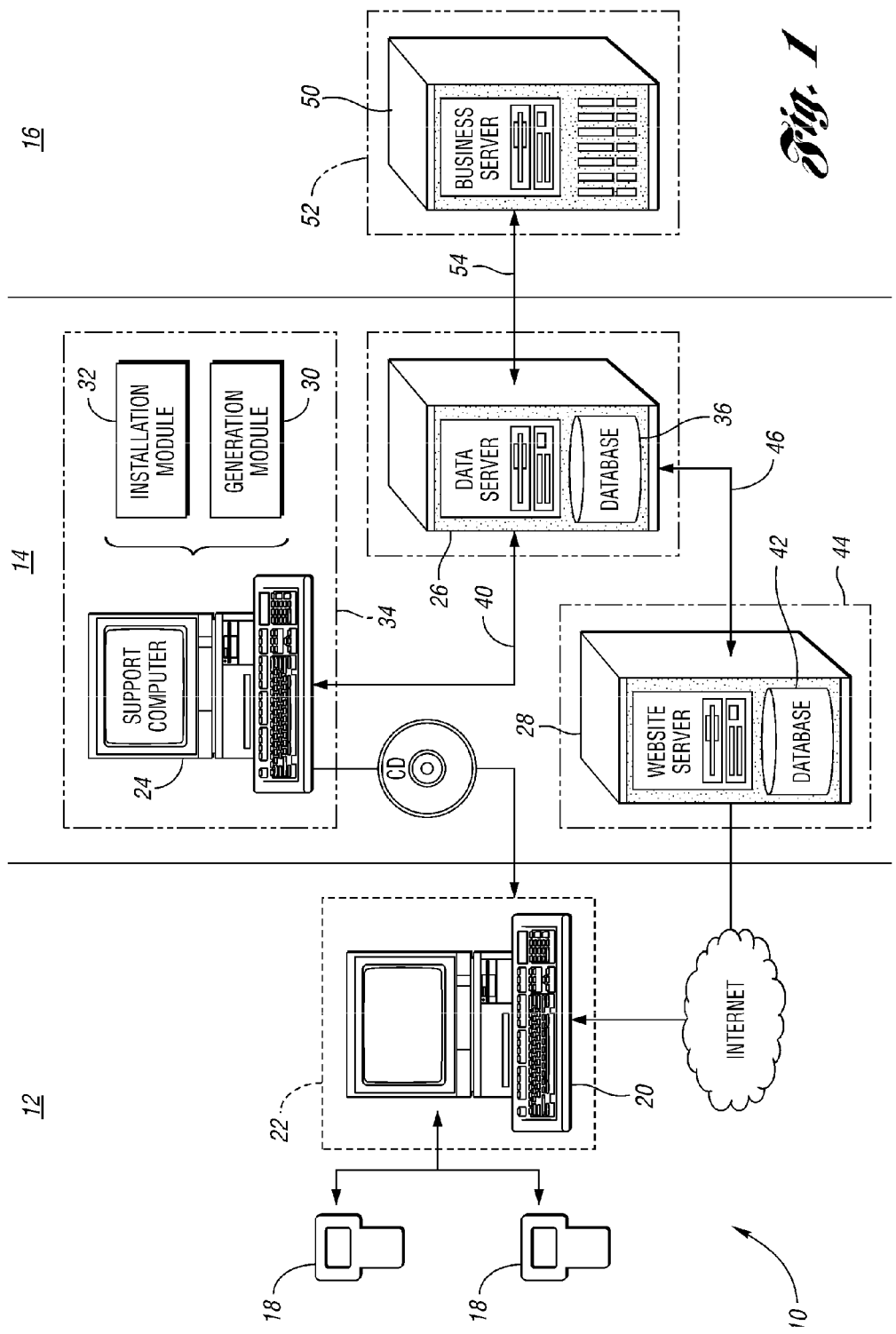
FIG. 1 is a computer system architecture for processing remanufactured part cores according to one embodiment of the present invention.

FIG. 1 is a computer system architecture 10 for processing remanufactured part cores according to one embodiment of the present invention. The computer system architecture 10 includes presentation tier 12, server tier 14, and back-end application tier 16.

The presentation tier 12 includes a number of personal digital assistant (PDA) devices 18 and workstation computer 20, which can be part of an external computer system, represented by dotted rectangle 22. In at least one embodiment, an external computer system is defined as a system that is outside the control of an internal computer system. For instance, the external computer system can be a vendor computer system and the internal computer system can be an OEM computer system.

The PDA device can be placed in an accompanying cradle to synchronize the data residing on the PDA device with the data stored on workstation computer 20. In at least one embodiment, the PDA devices are configured to execute an application for processing remanufactured part cores, otherwise referred to as a part core application. The part core application can be embedded in computer software loadable onto the PDA device. The part core application includes a number of functions for carrying out part core processing steps as contemplated by the present invention. It should be appreciated that the part core application can include one or more remote function calls for calling and executing functions residing on a remote computer system, e.g. computers that are a part of the server tier 14. In this way, the part core application does not have to include all the functions locally necessary to perform the processing, thereby saving memory space on the PDA device. In at least one embodiment, mobile users, e.g. truck drivers picking up part cores, utilize the PDA device.

The server tier 14 includes support computer 24, data server computer 26 and website server computer 28. The server tier 14 can function to provide storage of data uploaded from the PDA device and the ability to transmit data to and receive data from the PDA device.

In at least one embodiment, support computer 24 includes a generating module 30 for generating one or more part core applications and an installation module 32 for installing the generated applications. In at least one embodiment, the installation module 32 can be configured to write an installation application to a compact disc (CD) for installing the generated applications on workstation computer 20. Once the applications are installed on the workstation computer, the applications can be installed on the PDA device through a cradle synchronizing process. The support computer 24 can be part of an internal computer system, signified by dash-dotted rectangle 34. Data server computer 26 can include a database 36, which can include the following data: part core data, customer data, and/or PDA transaction data. Non-limiting examples of customers include dealers, e.g. vehicle dealers, and service entities, e.g. vehicle service entities, respectively. The data server 26 can also be part of an internal computer system, represented by dash-dotted rectangle 38. The data server 26 can be configured to transmit data from database 36 to support computer 24 through one-way communication line 40.

Website server computer 28 can include one or more web page files 42. The website server computer 28 can serve web pages based on the data contained in the one or more web page files 42. Computer 28 can be part of an internal business to business (B2B) computer system, represented by dashed rectangle 44. Website server computer 28 and data server computer 26 can be in communication with each other through two-way communication line 46. For instance, a served web page may request a user to input information relating to part core processing. This information can be transmitted through communication line 46 and stored in database 36. As another non-limiting example, part data residing in database 36 can be transmitted to website server 28, which serves one or more web pages containing the part information. Website server computer 28 can transmit served web pages to workstation computer 20 through one-way communication line 46 and Internet 48. In at least one embodiment, the served web pages can be formatted for display on the server of the PDA device.

The back-end application tier 16 includes a business server computer 50, which can be part of an internal computer system, represented by dash-dotted rectangle 52. Tier 16 can function to store data uploaded from the PDA devices into the corresponding internal business computer system. This storage function can be executed through a batch process. Business server computer 50 can be in two-way communication with data server 26 through communication line 54.

The communication lines identified above can be intranet-adaptable communication lines, for example, a dedicated line, a satellite link, an Ethernet link, a public telephone network, a private telephone network, and hybrids thereof. The communication lines can also be intranet-adaptable. Examples of suitable communication lines include, but are not limited to, public telephone networks, public cable networks, and hybrids thereof.

Figure 2:
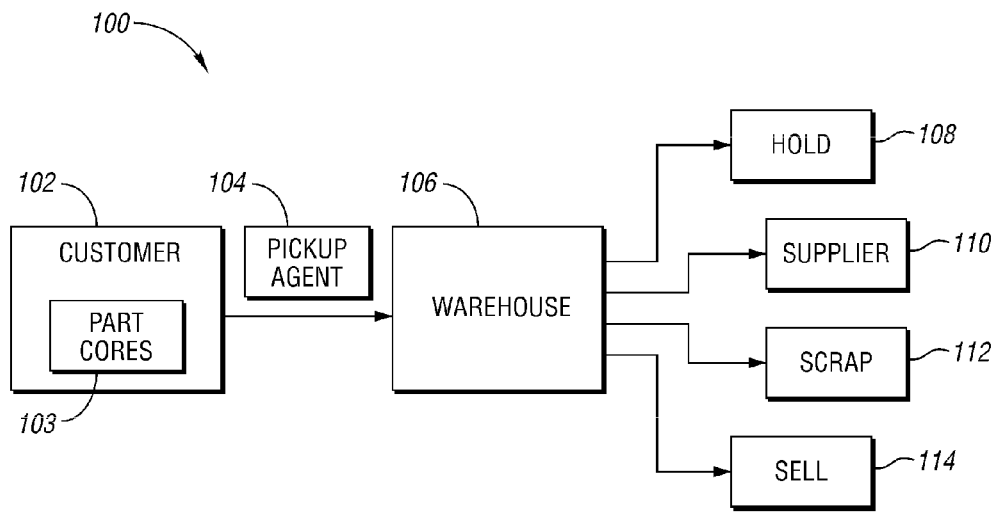
FIG. 2 is a flowchart depicting the movement part cores through the return process according to one embodiment of the present invention.

Turning to FIG. 2, a flowchart 100 depicting the movement of part cores through the return process according to one embodiment of the present invention is provided. Customer 102 has a number of part cores 103 at one or more sites that need to be processed, e.g. picked up and returned to the warehouse 106. The warehouse can be controlled or operated by an OEM, e.g. a vehicle OEM. A non-limiting example of a customer is a dealer, e.g. a vehicle dealer, or a service entity, e.g. a vehicle service entity. A pickup agent 104 arrives at customer 102 to process the part cores. One non-limiting example of such a process is depicted in FIG. 3. A non-limiting example of a pickup agent 104 is a truck driver that has a contractual obligation with the warehouse 106 to pick up and return part cores 103. In certain embodiments, the part core process includes generating a disposition label for each part core, picking up each part core, and returning each part core to the warehouse. A non-limiting example of pickup agent is a truck driver.

The pickup agent 104 delivers the picked up part cores to a warehouse 106. In at least one embodiment, the disposition label is utilized to identify how the part core should be further processed. Non-limiting examples of further processing includes holding the part core (108), sending the part core to a supplier (110), scrapping the part core (112), and/or selling the part core (114). Advantageously, the supplier can track inventory levels; part field attrition; customer attrition; optimize inventory levels; forecast breakdowns; and monitor cash flows based on the information produced and/or obtained during part core processing.

Turning to FIG. 3, a flowchart 200 depicting one embodiment for processing part cores is provided. In at least one embodiment, one or more of these steps is performed at one or more customer sites by a pickup agent using a PDA device, although other users and/or computer devices can be used to accomplish one or more of these steps. Moreover, it should be appreciated that the steps can be rearranged, modified and omitted according to the implementation of the present invention.

In block 202, a customer code is input. In at least one embodiment, the customer code can be used to identify the customer possessing the core that will be picked up. In at least one embodiment, the pickup agent inputs the customer code into a PDA device.

In block 204, the pickup agent visually identifies a container which houses a part core to be processed. In at least one embodiment, the container may include a number of part cores to be processed. In at least one embodiment, a tag is affixed to the container for identifying whether the part core is a retail or warranty part core. These tags are otherwise referred to as retail tags or warranty tags.

If, upon visual identification, the container has a warranty tag, the pickup agent performs the steps on the warranty side of flowchart 200. If the container has a retail tag, the pickup agent performs the steps on the retail side of flowchart 200. This decision point is represented by decision block 206 of flowchart 200.

Continuing onto the retail side of flowchart 200, the pickup agent uses the PDA device to scan the container for a part core identification (ID) code, according to block 208.

In decision block 210, the ability of the PDA device to scan the ID code is tested. If the PDA device is unable to scan the ID code, then the container is opened (block 212) to visually inspect the part core inside the container. In block 214, the pickup agent calls a function that is available through a part core application loaded on the PDA device to aid in identifying the part core. The function can include the ability to display parts on the PDA screen so that the pickup agent can obtain a visual match. Upon generating a visual match, the function can retrieve the ID code based on the match information. Moreover, the function can include the ability to prompt the pickup agent with a number of identification rules to aid in identifying the part core.

If the PDA device is able to scan the ID code, then the PDA application searches one or more part catalogs, which can reside on database 36, for the part core based on the ID code. In decision block 216, the ability to locate the part in the one or more part catalogs is tested. If the part core cannot be located in the one or more catalogs, then the identify function is executed (block 214). If by performing block 214, the product cannot be identified (decision block 218), then the product is not picked up (block 220). If the product can be identified by block 214, then the block 222 is performed.

In block 222, the pickup agent assigns a grade to the part core. In at least one embodiment, an alpha grading system having product grades in the range of "A" (highest grade) to "F" (lowest grade) is utilized to identify the value of the core to the remanufacturing process and/or sale of the core. In at least one embodiment, "A" is a new, unused core with no defects such that it can be sold as-is, "D" is a typical used core (the default code for most returned cores) to be remanufactured, and "F" is a severely damaged core to be scrapped.

In at least one embodiment, the pickup agent inputs one or more exception codes for the part core into the PDA device. Non-limiting examples of exception codes include dis-assembled cores, cores missing components, cores not drained of lubricants.

In block 224, the part core grade is input into the PDA device by the pickup agent, via a web page displayed on the PDA screen, for example.

In block 226, the repair order (RO) number is input into the PDA device by the pickup agent, via a web page displayed on the PDA screen, for example.

Figure 4:
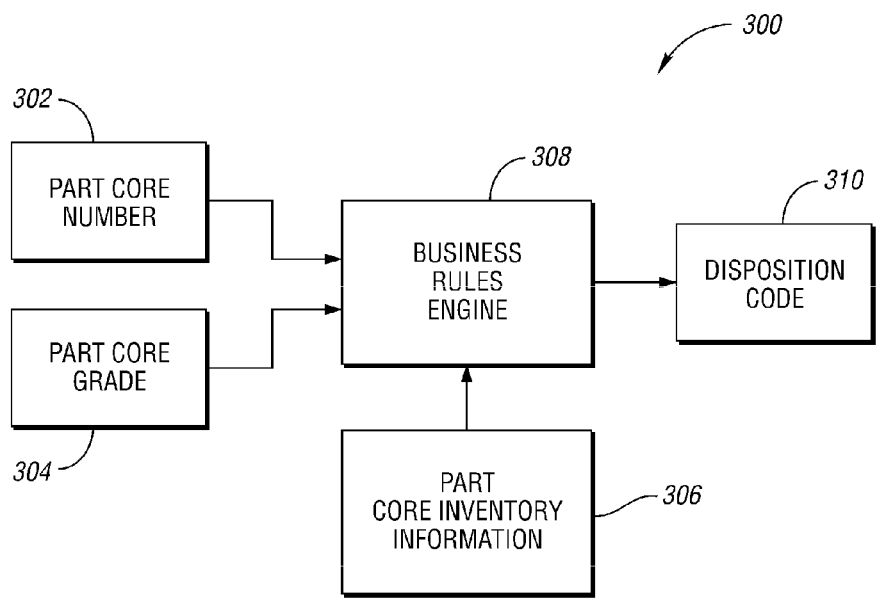
FIG. 4 is a flowchart depicting a method for generating a disposition code according to one embodiment of the present invention.

In block 228, a disposition code for the part core is generated. FIG. 4 is a flowchart 300 depicting a method for generating the disposition code according to one embodiment of the present invention. According to FIG. 4, the part number 302, the part grade 304 and part core inventory information is input into a business rules engine 306, which is comprised of a number of business rules. The business rules engine uses the input 302, 304 and/or 306 and the number of business rules to generate a disposition code 310. Non-limiting examples of part core inventory information includes forecasting data, current inventory levels, manufacturing attrition, suggested input levels, and lead time. In at least one embodiment, the business rules include: placing numeric limits on total system-wide core inventory wherein excess inventory can be scrapped or sold, maintaining inventory levels at suppliers and/or warehouse reserve locations, prioritizing disposition code based on core grade, prioritizing override factor(s) to be considered (e.g. based on customer code or an override table) and handling invalid input data (e.g. no forecast or no identified supplier).

In at least one embodiment, the disposition code is selected from a number of numeric codes. For instance, the numeric codes can be "1", "2", "3" and "4". The description associated with "1" can be hold the product at the warehouse. The description associated with "2" can be scrap the product. The description associated with "3" can be selling the product. The description associated with "4" can be shipping the product to a supplier.

Turning back to FIG. 3, a disposition label containing the disposition code is generated by the PDA device (block 230). If the disposition code is "2", "3" or "4", the label also includes the disposition description and supplier information, e.g. supplier code and/or name and address.

According to decision block 232, if one or more unprocessed containers exists at the current customer site, then the applicable steps of flowchart 200 are carried out on the next unprocessed container, starting with the first step downstream from circle label "B", i.e. the step in block 204.

Turning to the warranty side of flowchart 200, if the container has a warranty tag, the container is scanned with the PDA device for the warranty tag information (block 246).

If the PDA device is unable to scan the warranty tag on the container (decision block 248), then the pickup agent can input the information on the warranty tag into the PDA device (block 250).

In block 252, the information on the warranty tag is captured on the claim receipt, which can be stored on the PDA device. The next step on the warranty side is to check for more containers, as set forth in block 232.

Once all of the containers are processed, a claim/return order is generated by the PDA device (block 234). In at least one embodiment, data on the claim/return order includes the date, pickup agent, customer code, name and address, a detailed listing of the core part numbers picked up, the deposit to be credited for each core picked up, the total credit amount, and a claim reference number.

In block 236, a claim receipt is printed from the PDA device. In at least one embodiment, the claim receipt includes a core deposit credit that the customer will receive. The amount of core deposit credit to be received can be determined based on the part number, the customer's ID, and one or more of the business rules. In at least one embodiment, the customer signs the printed receipt and retains a copy for its files.

In decision block 238, the pickup agent identifies whether more customers having unprocessed containers exist. If yes, then the applicable steps of flowchart 200 carried out for the unprocessed containers at the next customer site, starting with the first step downstream from circle label "A", i.e. the step in block 202.

Alternatively, the pickup agent ends the trip and returns to the warehouse (block 240). In block 242, the PDA device is placed in its cradle, thereby transmitting the data obtained during the part core processing to the data server computer 26. The uploaded data can be used to generate an inventory receipt, including the disposition code and any exception codes, and to process customer credits. In at least one embodiment, one or more of the web page files 42 can be updated, for example, daily, with customer core deposit credit information. These web files can be accessed as web pages by the customer through a secure web portal. Once the truck arrives at the warehouse 106, the processed containers are unloaded (block 244). In at least one embodiment, all of the warranty tag containers are picked up and unloaded at the warehouse.

As required, detailed embodiments of the present invention are disclosed herein. However, it is to be understood that the disclosed embodiments are merely exemplary of the invention that may be embodied in various and alternative forms. Therefore, specific functional details described herein are not to be interpreted as limiting, but merely as a representative basis for the claims and/or as a representative basis for teaching one of ordinary skill in the art to variously employ the present invention.

While the best mode for carrying out the invention has been described in detail, those familiar with the art to which this invention relates will recognize various alternative designs and embodiments for practicing the invention as defined by the following claims.

What is claimed:

1. A computer having a central processing unit (CPU) for executing machine instructions and a memory for storing machine instructions that are to be executed by the CPU, the machine instructions when executed by the CPU implement the following functions:
    receiving remanufactured part core inventory information which includes an inventory forecast and an inventory level for a number of parts;
    receiving one or more business rules which includes a placement of a numeric limit on a total part core inventory;
    receiving information identifying an unprocessed part which is a member of the number of parts;
    receiving reusability grade, identifying whether the identified unprocessed part is reusable or non-reusable;
    determining whether a part is reusable or non-reusable based on the received reusability grade;
    determining whether the reusable, unprocessed part or non-reusable, unprocessed part is an excess inventory part or a non-excess inventory part based on the one or more business rules; and
    depending on whether the reusable, unprocessed part or non-reusable, unprocessed part is an excess inventory part or a non-excess inventory part, determining a part disposition for the reusable, unprocessed part or non-reusable, unprocessed part based on the remanufactured part core inventory information and the part identifying information, wherein if the unprocessed part is a non-excess inventory part, the part disposition is selected from the group consisting of holding the part or shipping the part, and wherein if the unprocessed part is an excess inventory part, the part disposition is selected from the group consisting of selling the part or scrapping the part.

2. The computer of claim 1 wherein the computer is a portable electronic device.

3. The computer of claim 2 wherein the portable electronic device is a portable digital assistant (PDA).

4. The computer of claim 1 wherein the functions further comprise generating a claim receipt including the part identifying information and the part disposition.

5. The computer of claim 4 wherein the part identifying information is a part number.

6. The computer of claim 1 wherein the functions further comprise determining a core deposit credit value for the part with a part disposition.

7. The computer of claim 1 wherein the reusability grade is based on a scaled rating of the part with respect to its reusability.

8. The computer of claim 1 wherein the one or more business rules further include information relating to part handling, wherein the functions further include utilizing a plurality of disposition codes to identify the manner in which a part is handled based on the part handling information.

9. The computer of claim 1 wherein the functions further comprise:
    generating part processing data based on the executed functions; and
    transmitting the part processing data for processing of customer core deposit credit information.

10. The computer of claim 9 wherein processing customer core deposit credit information includes updating a data repository of customer core deposit credit information.

11. A non-transitory computer-readable medium comprising executable instructions for:
    receiving remanufactured part core information including inventory forecast and level for a number of parts;
    receiving a business rules including a numeric limit on core part inventory;
    receiving a part number identifying an unprocessed one of the number of parts and reusability grade for the unprocessed part;
    identifying the part as reusable or non-reusable based on the grade; determining whether the reusable, unprocessed part or non-reusable, unprocessed part is an excess inventory part or a non-excess inventory part based on the business rules; and
    depending on whether a reusable, unprocessed part or non-reusable, unprocessed part is an excess inventory part or a non-excess inventory part, determining a part disposition for the reusable, unprocessed part or non-reusable, unprocessed part based on the remanufactured part core inventory information and the part identifying information, wherein if the unprocessed part is a non-excess inventory part, the part disposition is selected from the group consisting of holding the part or shipping the part, and wherein if the unprocessed part is an excess inventory part, the part disposition is selected from the group consisting of selling the part or scrapping the part.

12. The computer-readable medium of claim 11 further comprising executable instructions for displaying a web-based user interface for receiving the reusability grade.

13. The computer-readable medium of claim 11 further comprising executable instructions for:
generating a disposition code based on the part disposition; and
presenting the disposition code.

14. The computer-readable medium of claim 13 wherein the executable instructions for presenting the disposition code includes executable instructions for:
generating a part disposition label for the part; and
printing the part disposition code on the label so that it can be relied upon to process the part.

15. The computer-readable medium of claim 13 further comprising executable instructions for presenting a part disposition description associated with at least one part disposition code.

16. A computer-program product for processing remanufactured part cores, the computer-program product stored in a computer-readable medium and executing on the computer-readable medium and comprising instructions for:
receiving remanufactured part core inventory information, the inventory information including an inventory forecast and an inventory level for a number of parts;
receiving part identifying information for an unprocessed part from the number of parts;
receiving one or more business rules including a placement of a numeric limit on a total part core inventory;
receiving a reusability grade for the unprocessed part;
determining that the unprocessed part is reusable or non-reusable based on the reusability grade;
determining whether the reusable, unprocessed part or non-reusable, unprocessed part is an excess inventory part or a non-excess inventory part based on the business rules;
if the reusable, unprocessed part is excess inventory, determining a part disposition of selling the part or scrapping the part;
if the reusable, unprocessed part is non-excess inventory, determining a part disposition of holding the part or shipping the part; and
if the unprocessed part is non-reusable, determining a part disposition of scrapping the part.

17. The computer-program product of claim 16 further comprising instructions for assigning a part disposition identifier to the unprocessed part based on the part disposition.

18. The computer-program product of claim 17 wherein the identifier is a numeric code.

19. The computer-program product of claim 18 further comprising instructions for prioritizing disposition codes based on reusability grade.

* * * * *